Nov. 7, 1972  D. W. ALLEY  3,702,198
HITCH OR COUPLING PIN
Filed Sept. 14, 1970
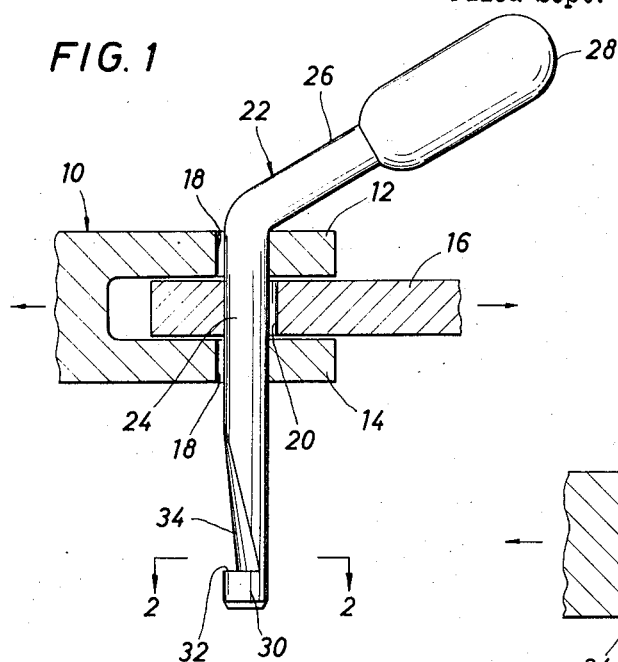
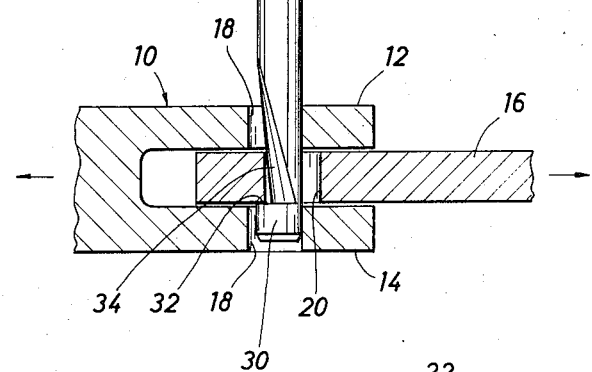
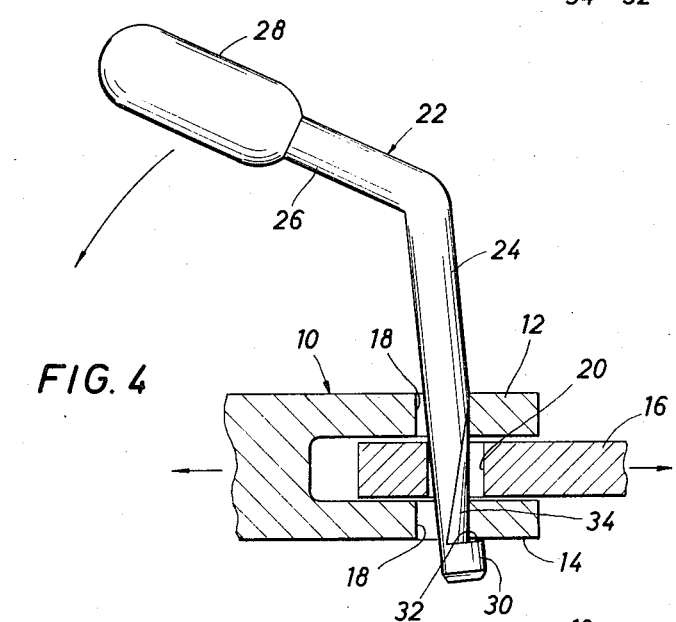
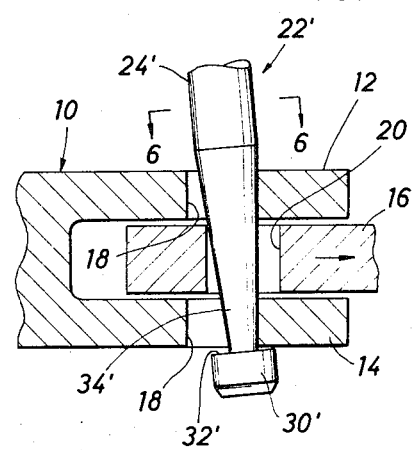
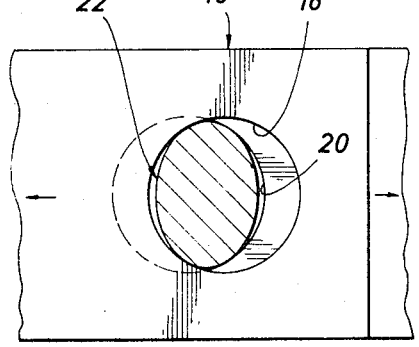
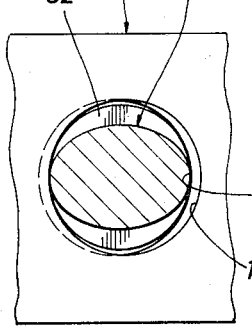
David W. Alley
INVENTOR
BY Charles E. Lightfoot
ATTORNEY

3,702,198
HITCH OR COUPLING PIN
David W. Alley, 5917 Harbrook, Houston, Tex. 77017
Filed Sept. 14, 1970, Ser. No. 72,029
Int. Cl. B60d 1/02
U.S. Cl. 280—515                           5 Claims

ABSTRACT OF THE DISCLOSURE

A hitch or coupling pin for insertion through aligned openings in two parts of a coupling to connect the same together and having means for preventing accidental disconnection of the coupling by dislodgement of the pin but which permits the pin to be readily removed by lifting the pin out of the openings. The pin is provided with means tending to tilt the pin away from a position in alignment with the openings of the coupling when the pin is inserted therethrough and means engageable with the coupling to prevent removal of the pin when the pin is so tilted, but which permits the pin to be lifted out of the openings to disconnect the parts when the pin is held in alignment with the openings.

BACKGROUND OF THE INVENTION

In releasably connecting together various kinds of equipment, such as tractors used in towing farm machinery or other implements, it is customary to make use of couplings having interfitting parts provided with openings which may be moved into vertical alignment and through which a hitch pin is inserted to connect the parts together.

Coupling devices of this kind are usually provided with means, such as cotter pins, wires, latches, and the like which are attached to or inserted through the hitch pin below the coupling when the pin is inserted and which serve to prevent the pin from being accidentally dislodged from the coupling, such as might occur during operation of the equipment over rough ground.

The use of auxiliary means, such as cotter pins, latches, nuts, or the like on hitch pins in equipment of this kind makes it necessary that such means be first removed before the coupling can be disconnected, thus greatly increasing the inconvenience and time consumed in coupling and uncoupling the equipment.

Under circumstances in which it is necessary to frequently disconnect and reconnect couplings of this kind, such as in the use of numerous different farm implements with only one tractor, the tedious and time consuming operations of removing and reattaching the pin retaining device present a serious inconvenience in the use of such equipment.

SUMMARY OF THE INVENTION

Briefly described, the hitch pin of the present invention comprises an elongated rod of generally annular shape in cross-section, formed with a straight shank adapted to be inserted through aligned openings in the parts of a coupling device to be connected together, and having a projection or shoulder on the shank positioned to engage one of the parts of the coupling radially outwardly of the opening thereof to prevent the pin from becoming dislodged from the coupling due to bouncing or other movement of the parts, but which will permit the pin to be lifted out of the openings of the parts when the shank is held in a position of alignment with the openings. The pin is provided with means, such as a handle disposed in laterally offset relation to the axis of the shank tending to tilt the shank out of alignment with the opening of the coupling to position the projection on the shank for engagement with the coupling to hold the pin against upward movement out of the openings.

The shank of the pin may be of circular shape in cross-section and of a diameter somewhat smaller than that of the openings of the parts of the coupling to provide clearance to allow easy insertion of the pin while permitting tilting of the pin sufficient to position the projection of the shank to engage the coupling to prevent dislodgement of the pin, or the shank of the pin may be of elliptical shape, the longer axis or diameter of the ellipse being nearly as long as the diameter of the openings of the parts of the coupling and the projection or shoulder of the shank extending radially outwardly beyond one end of the shorter diameter or axis of the ellipse, whereby the parts may be moved longitudinally relative to each other by rotation of the pin to bring the openings and the shank into close vertical alignment to allow the projection or shoulder to pass freely upwardly out of the openings upon upward movement of the pin.

The invention has for an important object the provision of a hitch pin formed in one piece having means for preventing accidental disconnection of the coupling in which the pin is used, but which can be removed by merely lifting the pin out of the coupling, thus obviating the use of retainer means which must be separately operated after insertion of the pin and before its removal.

BRIEF DESCRIPTION OF THE VIEWS OF THE DRAWINGS

FIG. 1 is a side elevational view, partly in cross-section, illustrating a preferred embodiment of the hitch or coupling pin of the invention, showing the same in operating position in a coupling device;

FIG. 2 is a cross-sectional view, on an enlarged scale, taken along the line 2—2 of FIG. 1, looking in the direction indicated by the arrows;

FIG. 3 is a view similar to that of FIG. 1 illustrating the manner in which the pin of the invention functions in one condition of the coupling to prevent accidental releasing of the coupling;

FIG. 4 is a view similar to that of FIG. 1 illustrating the functioning of the pin in another condition of the coupling to prevent accidental releasing thereof;

FIG. 5 is a fragmentary side elevational view, partly in cross-section, illustrating a somewhat different form of the pin of the invention and showing the manner in which the same functions to prevent accidental dislodgement of the pin from the coupling;

FIG. 6 is a cross-sectional view, on an enlarged scale, taken along the line 6—6 of FIG. 5, looking in the direction indicated by the arrows and illustrating a further modification of the invention and showing the pin in one position of axial rotation in the coupling; and FIG. 7 is a view similar to that of FIG. 6 showing the pin in a position rotated 90 degree from the position of FIG. 6.

DETAILED DESCRIPTION OF PARTICULAR EMBODIMENT OF THE INVENTION

Referring now to the drawings in greater detail, the hitch or coupling pin of the invention is illustrated herein in connection with its use in a coupling of a well known kind, such as a tractor hitch by which various pieces of farming equipment or the like may be releasably connected to a tractor to be towed about thereby.

The coupling or tow-hitch of the present illustration is of a type having two coupling elements or parts, of which the part 10 takes the form of a clevis, formed with a U-shaped end portion leaving upper and lower vertically spaced arms 12 and 14, while the other part 16 is a tongue adapted to be loosely inserted between the arms of the U.

The arms 12 and 14 of the clevis 10 are provided with vertically aligned openings 18 and the tongue 16 has an opening 20, the openings 18 and 20 being positioned to allow the tongue to be inserted into the clevis to a position to bring all of the holes into axial alignment to allow a hitch pin to be inserted through the holes to connect the parts together.

The hitch pin of the invention is generally designated 22, and is of elongated rod-like form generally round in cross-section and of a diameter somewhat smaller than that of the openings 18 and 20 to provide clearance to allow the pin to be easily inserted when the openings in the parts are aligned or nearly so.

The pin 22 is formed with a straight hitch engaging portion or shank 24 for insertion through the openings 18 and 20 to a position extending substantially below the arm 14 of the clevis, and an upwardly extending or handle portion 26 positioned to extend above the upper arm 12 of the clevis and which is off-set or bent out of axial alignment with the portion 24 whereby the pin is extended therethrough. The upward extension of handle portion 26 of the pin may, if desired, be provided with a knob 28 or other convenient device forming a weight positioned to increase the tendency of the pin to tilt away from alignment with the openings 18 and 20 when the pin is in the hitch.

The shank 24 of the pin is formed with a portion 30 forming an upwardly facing shoulder 32 positioned laterally opposite the handle portion 26 which shoulder is positioned to engage one of the parts of the coupling upon upward movement of the pin, due to bouncing or other movement of the coupling, to prevent the pin from accidentally coming out of the pin receiving openings and releasing the coupling.

The shoulder 32 may conveniently be formed on the pin by cutting away a portion of the pin to form a tapered face 34 on the pin, leaving the portion 30 below the shoulder of substantially the same cross-sectional configuration as the portion 24 above the taper.

In making use of the invention, the tongue 16 is inserted between the arms 12 and 14 of the clevis 10 to assemble the coupling with the openings 18 and 20 in vertical alignment, whereupon the pin 22 is inserted through the openings to connect the parts together. The pin is held in the coupling by gravity and in the event that the pin should be displaced upwardly by bouncing or other action of the coupling due to the passage of the tractor and the equipment being towed thereby over rough ground, the tilting of the pin by the weight of the offset handle will cause the shoulder 32 to engage the lower face of the arm 14 radially outwardly of the opening 18 thereof to prevent the pin from coming out of the coupling. Should the pin move upwardly with the parts of the coupling in the positions shown in FIG. 3 with the handle 22 extending forwardly and the shoulder 32 projecting rearwardly, the portion 24 may be held vertically by the engagement of the cylindrical surface thereof with the arms 12 and 14 in the openings 18. In this event, however, the shoulder 32 will engage the tongue 16 radially outwardly of the opening 20, as seen in FIG. 3 to prevent the pin from moving out of the coupling.

If the pin should move upwardly and the conditions shown in FIG. 4, with the handle 22 extending rearwardly and the shoulder 32 extending forwardly, then the pin will be tilted to cause the shoulder to engage the arm 14 of the clevis radially outwardly of the opening 18 to hold the pin against further upward movement.

By making the pin substantially smaller in diameter than the openings 18 and 20, sufficient clearance may be provided between the pin and the parts of the coupling in the openings 18 and 20 to allow the pin to tilt to position the shoulder 32 to engage the lower arm 14 to hold the pin against dislodgement from the coupling.

When it is desired to disconnect the coupling the pin can be lifted by the handle 22, holding the pin in a vertical position so that the shoulder 32 does not engage the parts but passes freely through the openings 18 and 20 to release the parts.

A somewhat modified form of the pin of the invention is illustrated in FIGS. 5, 6, and 7, wherein the pin 22' has the shank portion 24' adapted to be inserted through the openings 18 and 20 of the coupling parts and is formed near its lower end with a downwardly tapering portion 34' providing an upwardly facing shoulder 32' of generally annular shape.

The shank 24' and end portion 30' may also be of generally elliptical shape in cross-section, as shown in FIGS. 6 and 7.

In other respects the form of the pin illustrated in FIGS. 5, 6 and 7 may be similar to that illustrated in FIGS. 1 to 4.

The pin constructed as shown in FIGS. 5, 6 and 7 may be inserted in the openings of the coupling parts in the same manner as previously described, so that in the event of accidental upward movement of the pin, the handle will tend to cause the pin to tilt away from alignment with the openings 18 and 20 to engage the shoulder 32' with the arm 14 radially outwardly of the opening 18 therein to arrest the disconnecting movement of the pin. The pin may, however, be readily removed by pulling the pin upwardly while holding the shank in a position of alignment with the openings to allow the shoulder 32' to pass through the same.

In the event that the coupling is to be disconnected with the parts positioned with the parts positioned as seen in FIG. 6, the opening 20 being somewhat misaligned relative to the openings 18, then the pin may be rotated to bring the openings into a closer condition of ailgnement as shown in FIG. 7 by turning the pin so that the longer diameter or axis of the cross-sectional ellipse of the shank extends longitudinally of the parts instead of transversely of the same as seen in FIG. 6. With the parts thus moved slightly longitudinally relative to each other to align the openings 18 and 20 as in FIG. 7, the pin may be readily lifted out of the openings without engaging the shoulder 32' with the parts.

It will, of course, be apparent that the shank 24 and end portion 30 of the pin 10 may also be of elliptical shape in cross-section for operation in the same manner as the shank 24' of the pin 10', the shoulder 32 extending radially outwardly beyond one end of the shorter diameter or axis of the ellipse.

It will thus be seen that the invention provides a hitch or coupling pin of simple design and rugged construction, having means for preventing accidental releasing of the coupling, but which may be readily removed to disconnect the same, and which requires no separate means for retaining the pin against withdrawal.

Having thus clearly shown and described the invention, what is claimed as new and desired to secure by Letters Patent is:

1. A hitch pin having a shank adapted to be inserted through aligned openings in two parts to be connected together, said shank having a cross-sectional shape to provide clearance between the shank and ports in the openings to allow the shank to tilt out of axial alignment with the openings when the parts are positioned with the openings in axial alignment;

means on said shank positioned for coaction with one of said ports when said shank is out of axial alignment with said openings to hold the shank against movement in a direction to move the shank out of said openings; and, weight means on said shank positioned to cause said shank to tilt under the influence of gravity from a vertical axial position in said openings when said openings are in vertical alignment.

2. The hitch pin as claimed in claim 1 including handle means on said shank positioned to be effected by gravity to urge said shank toward a position out of axial alignment with said openings when the openings are in axial alignment.

3. The hitch pin as claimed in claim 1, wherein said shank is of continuously curved cross-sectional shape having a cross-sectional dimension in one direction of a length to cause opposite peripheral surface portions of the shank to be engaged with diametrically opposed surface portions of said parts within said openings upon rotation of said shank to urge said parts in directions relative to each other to move said openings into axial alignment when said shank reaches a predetermined position of such rotation.

4. The hitch pin as claimed in claim 3 wherein said shank is of elliptical shape in cross-section.

5. The hitch pin as claimed in claim 4 wherein said first mentioned means on said shank includes an upwardly facing surface portion on said shank extending radially beyond one end of the shorter diameter of the ellipse of said cross-section and lying within a circle whose diameter is equal to the longer diameter of said ellipse and whose center is on the axis of said shank.

References Cited

UNITED STATES PATENTS

| | | | |
|---|---|---|---|
| 3,198,056 | 8/1965 | Gowan | 280—515 |
| 3,146,003 | 8/1964 | Ronde | 280—515 |
| 3,350,117 | 10/1967 | Kassmeier | 280—515 |

FOREIGN PATENTS

| | | | |
|---|---|---|---|
| 1,111,516 | 7/1961 | Germany | 280—515 |

BENJAMIN HERSH, Primary Examiner

R. R. SONG, Assistant Examiner